United States Patent
Kim et al.

(10) Patent No.: US 9,395,695 B2
(45) Date of Patent: Jul. 19, 2016

(54) LIGHTING APPARATUS OF CLOCK FOR VEHICLE

(71) Applicants: Hyundai Motor Company, Seoul (KR); Kia Motors Corp., Seoul (KR)

(72) Inventors: Hyun Kim, Yongin-si (KR); Yong Soo Chang, Seoul (KR); Bock Cheol Lee, Suwon-si (KR); Wook Hyun Choi, Gimhae-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 64 days.

(21) Appl. No.: 14/322,621

(22) Filed: Jul. 2, 2014

(65) Prior Publication Data

US 2015/0175066 A1    Jun. 25, 2015

(30) Foreign Application Priority Data

Dec. 19, 2013   (KR) .......................... 10-2013-0159540

(51) Int. Cl.
  *B60Q 3/04*      (2006.01)
  *G04B 19/30*    (2006.01)
  *G01D 11/28*    (2006.01)

(52) U.S. Cl.
  CPC  *G04B 19/30* (2013.01); *B60Q 3/04* (2013.01); *G01D 11/28* (2013.01)

(58) Field of Classification Search
  CPC .......... G04B 19/30; B60Q 3/04; B60Q 3/044; B60Q 3/048; F21V 13/04; G01D 11/28; G04G 9/0041
  USPC ..................................... 368/6, 234
  See application file for complete search history.

(56) References Cited

U.S. PATENT DOCUMENTS

| | | | | |
|---|---|---|---|---|
| 6,477,133 B1 * | 11/2002 | Yoshimura | ............. | G11B 33/08 720/702 |
| 7,537,363 B2 * | 5/2009 | Kato | ...................... | G01D 11/28 362/471 |
| 7,771,069 B2 * | 8/2010 | Werman | ................... | G01D 7/00 362/23.01 |
| 8,172,414 B2 * | 5/2012 | Tamura | ................ | G02B 6/0038 362/23.01 |
| 2011/0255376 A1 | 10/2011 | Heers et al. | | |
| 2013/0027902 A1 * | 1/2013 | Miyazawa | ............. | G01D 11/28 362/23.14 |
| 2015/0103509 A1 * | 4/2015 | Sato | ....................... | G01D 11/28 362/23.14 |

FOREIGN PATENT DOCUMENTS

| | | |
|---|---|---|
| JP | 9-281255 A | 10/1997 |
| JP | 2012-42879 A | 3/2012 |
| KR | 20-1997-0002503 Y1 | 3/1997 |
| KR | 10-2005-0106964 A | 11/2005 |
| KR | 20-2011-0000795 U | 1/2011 |

* cited by examiner

*Primary Examiner* — Peggy Neils
(74) *Attorney, Agent, or Firm* — Morgan, Lewis & Bockius LLP

(57) ABSTRACT

A lighting apparatus may include a printed circuit board (PCB) for supplying power, a light source electrically connected to the PCB and generating light, a reflector installed to be positioned at a front of the light source and positioned in a case and guiding the light generated from the light source together with the case, and a prism installed to be positioned at a front of the reflector and surround a dial plate and concentrating the light guided by the reflector and the case into the dial plate.

9 Claims, 5 Drawing Sheets

LIGHTING APPARATUS OF CLOCK FOR VEHICLE

CROSS REFERENCE TO RELATED APPLICATION

The present application claims priority of Korean Patent Application Number 10-2013-0159540 filed on Dec. 19, 2013, the entire contents of which application are incorporated herein for all purposes by this reference.

BACKGROUND OF INVENTION

1. Field of Invention

The present invention relates to a lighting apparatus of a clock for a vehicle, and more particularly, to a lighting apparatus of a clock for a vehicle capable of improving night visibility and promoting a weight reduction and a cost reduction.

2. Description of Related Art

A clock mounted in a vehicle needs to have a condition capable of securing sufficient visibility at the time of driving at night.

A lighting apparatus of a clock for a vehicle for achieving this condition is configured to include a printed circuit board (PCB) 1 for supplying power, a light emitting diode (LED) light source 2 generating light, a prism 3 forming a wave guide to guide a travel of the light generated from the light source 2, and diffuser 5 uniformly diffusing the light guided from the prism 3 toward a dial plate 4, as shown in FIG. 1.

However, since the lighting apparatus according to the related art has the prism 3 configured at a front end of the light source 2 and the diffuser 5 configured at a front end of the prism 3, the prism 3 simply guides the travel of light and the diffuser 5 diffuses light. Therefore, since a portion of light diffused through the diffuser 5 is scattered (an arrow M1) to a side of the dial plate 4 and is dissipated, light loss may be caused, thereby reducing night visibility.

In addition, in order to secure sufficient visibility considering light loss, the number of light sources 2 needs to be increased. As a result, the number of parts, weight, and costs may be increased, respectively.

In addition, the dial plate 4 configuring a portion of the lighting apparatus of the clock which is mainly colored with white is used. However, the white dial plate 4 has a crash of colors with an interior material colored with a dark color (black, brown, or the like) to seek luxuriousness, thereby reducing luxuriousness of the vehicle.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a lighting apparatus of a clock for a vehicle capable of significantly improving night visibility by removing light scattered and dissipated to a side of a dial plate and promoting a reduction of the number of parts, a weight reduction, and a cost reduction by improving visibility.

Various aspects of the present invention contribute to implementing a luxuriousness image of a vehicle through color harmony of a dial plate and an interior material by implementing a color of the dial plate configuring a portion of the lighting apparatus of the clock for the vehicle with a dark color in harmony with a color of the interior material and forming a light transmitting part in the dial plate to thereby secure visibility of a time display unit.

According to various aspects of the present invention, there is provided a lighting apparatus of a clock for a vehicle that may include a printed circuit board (PCB) for supplying power, a light source electrically connected to the PCB and generating light, a reflector installed to be positioned at a front of the light source and positioned in a case and guiding the light generated from the light source together with the case, and a prism installed to be positioned at a front of the reflector and surround a dial plate and concentrating the light guided by the reflector and the case into the dial plate.

The light source may be installed to be positioned between the case and the reflector. A bottom of the prism may be provided with a plurality of diffusing dots implementing a rear lighting of the dial plate by refracting and scattering light that has been branched into the bottom of the prism. The light source may be a light emitting diode (LED) light source capable of increasing energy efficiency.

The reflector may have a size smaller than the case, such that when the reflector is installed in the case, a space may be formed between the case and the reflector, and the light source may be positioned in the space between the case and the reflector. The case may serve as a wave guide reflecting light from the light source together with the reflector to thereby guide the light to the prism. The case may have inner surfaces coated to have a condition favorable to reflection of light. The diffusing dots may be formed on the bottom of the prism and protruded to a rear surface facing the PCB.

The dial plate may be provided with side portions connected to the bottom, and the side portions may surround an outer frame of the dial plate to prevent light from being scattered and dissipated to a side of the dial plate. Outer ends of the side portions may be formed to include an inclined surface or surfaces to concentrate light into a center of the dial plate, thereby implementing a side lighting of the dial plate by the side portions of the prism.

The dial plate may be formed to have a dark color in harmony with a color of an interior material, and the dial plate may be provided with a light transmitting part to secure visibility of a time display unit.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
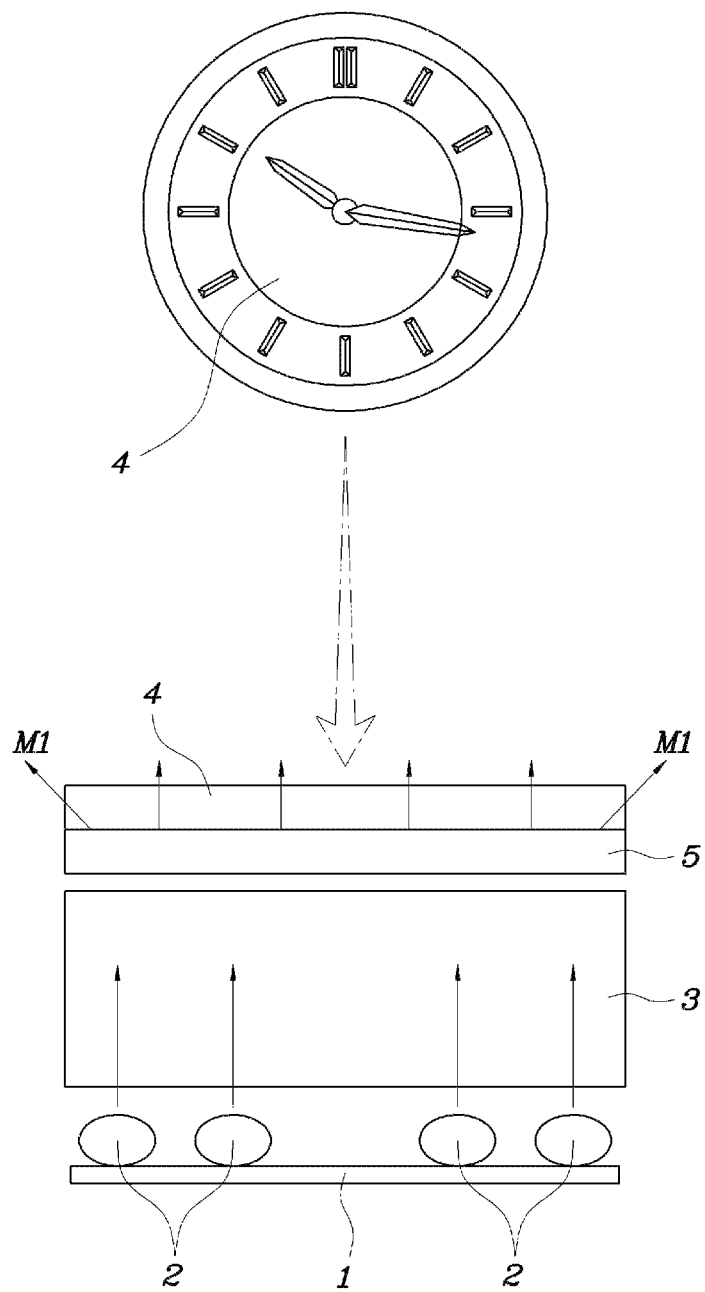
FIG. 1 is a view for describing a lighting apparatus of a clock for a vehicle according to the related art.
Figure 2:
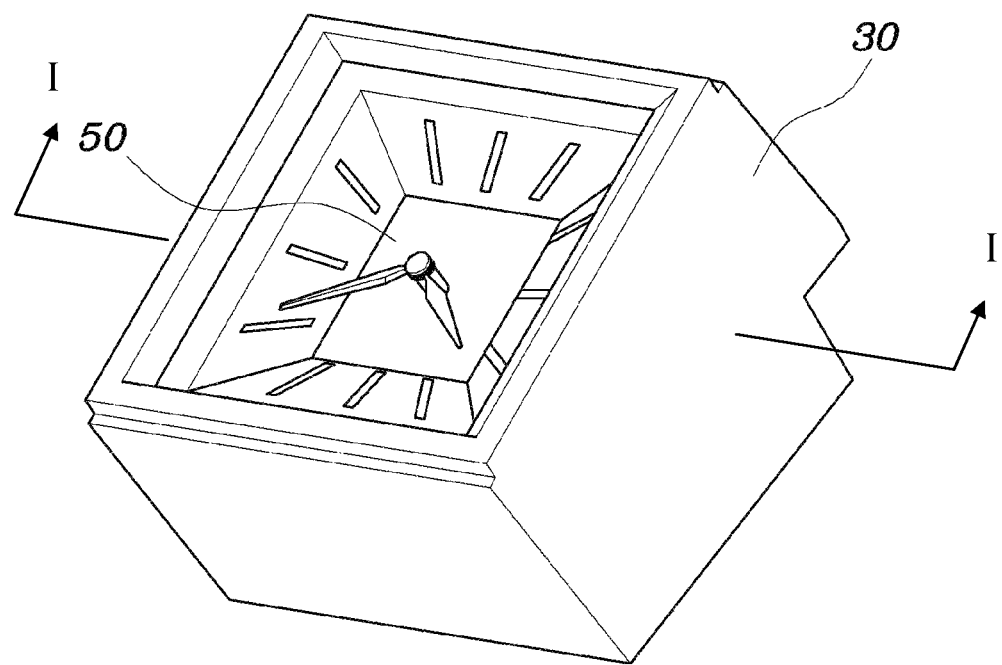
FIGS. 2 to 4 are assembled or exploded views illustrating an exemplary lighting apparatus of a clock for a vehicle according to the present invention.
Figure 3:
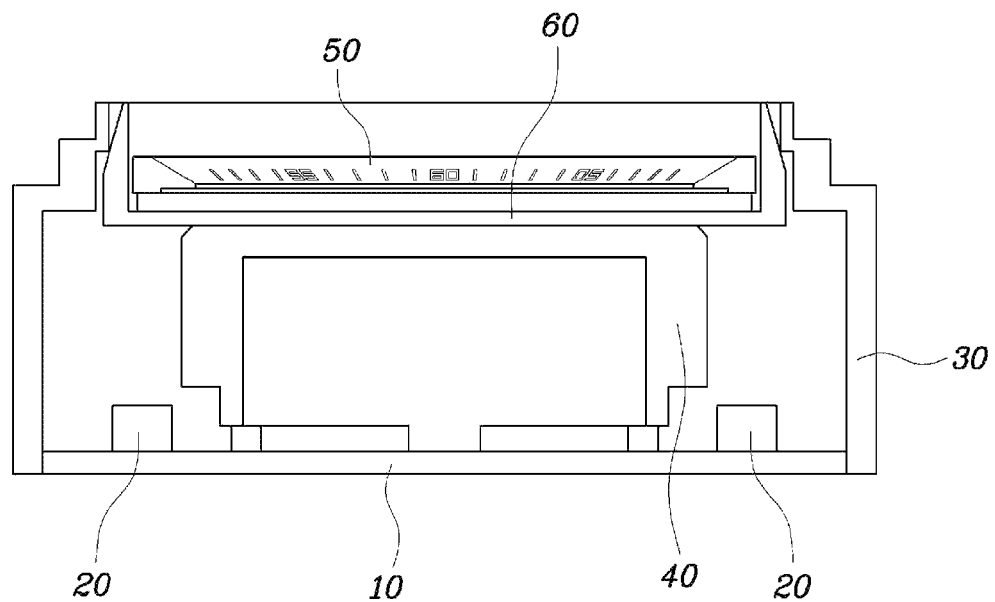
Figure 4:
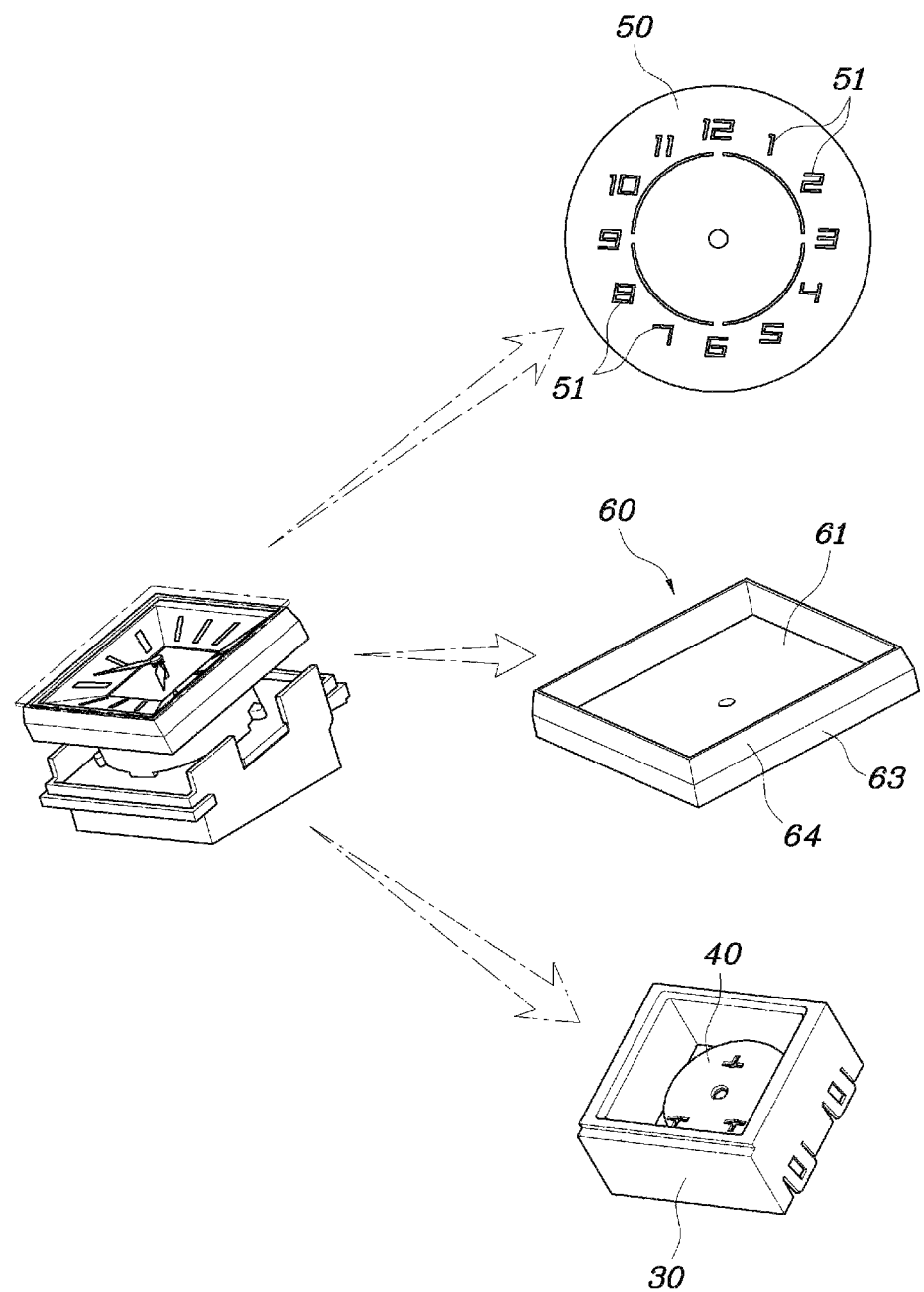
Figure 5:
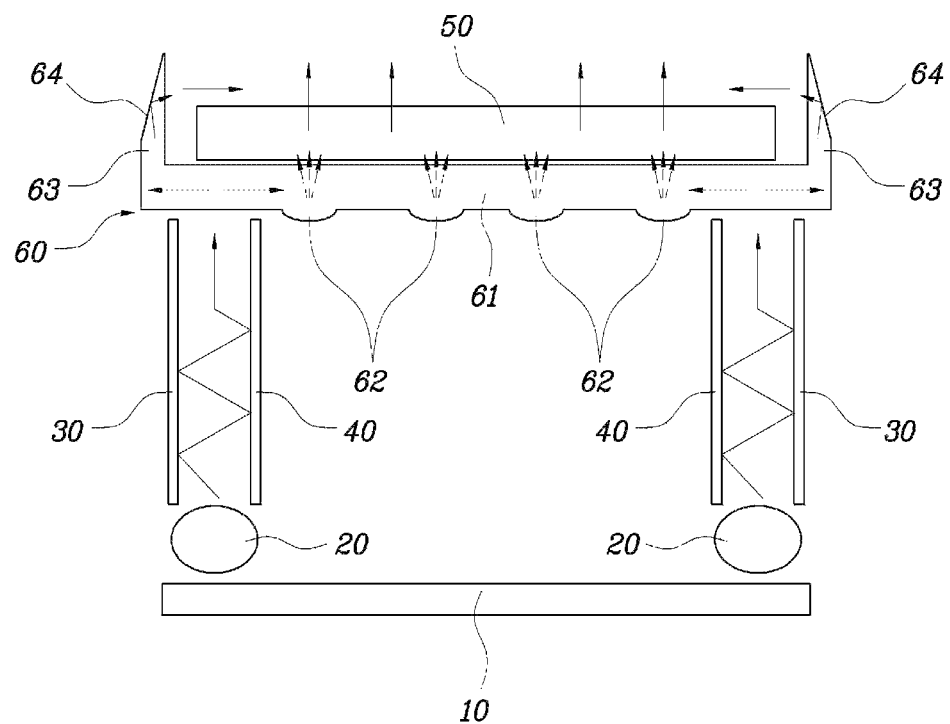
FIG. 5 is a cross-sectional view, taken along line I-I of FIG. 2, schematically showing a configuration of an exemplary lighting apparatus according to the present invention.

A lighting apparatus of a clock for a vehicle according to various embodiments of the present invention is configured to include a printed circuit board (PCB) 10 for supplying power; a light source 20 electrically connected to the PCB 10 and generating light; a reflector 40 installed so as to be positioned at a front of the light source 20 and positioned in a case 30 and guiding a travel of light generated from the light source 20 together with the case 30; and a prism 60 installed so as to be positioned at a front of the reflector 40 and surround a dial plate 50 and concentrating light guided from the reflector 40 into the dial plate 50, as shown in FIGS. 2 to 5.

As the light source 20, a light emitting diode (LED) may be used to increase energy efficiency, but the present invention is not limited thereto.

When the reflector 40 is installed in the case 30, the reflector 40 is installed to provide a space between the case 30 and the reflector 40 and is installed to position the light source 20 in the space between the case 30 and the reflector 40.

The case 30 serves as a wave guide reflecting light from the light source 20 together with the reflector 40 to thereby guide the travel of light to the prism 60. To this end, inner surfaces of the case 30 may be configured to have a condition favorable to reflection of light and may be coated to facilitate the reflection of light, as an example.

A bottom 61 of the prism 60 is integrally provided with a plurality of diffusing dots 62 implementing a rear lighting of the dial plate 50 by refracting and scattering light branched into the bottom 61. One will appreciate that such integral components may be monolithically formed. The diffusing dot 62 may be formed on a rear surface of the bottom 61, that is, a surface facing the PCB 10.

As described above, since the bottom 61 of the prism 60 is integrally provided with the diffusing dots 62, a diffuser which is separately configured to diffuse light according to the related art is not used, thereby making it possible to promote a reduction of the number of parts, a weight reduction, and a cost reduction.

In addition, the prism 60 is provide with side portions 63 connected to the bottom 61, wherein the side portion 63 has a shape surrounding an outer frame of the dial plate 50, thereby making it possible to prevent light from being scattered and dissipated to a side of the dial plate 50.

Particularly, the side portions 63 of the prism 60 serve to concentrate light branched from bottom 61 to the side portions 63 into the center of the dial plate 50 to thereby implement a side lighting, thereby making it possible to significantly improve night visibility of the clock.

In the case in which visibility of clock is significantly improved by the prism 60 according to various embodiments of the present invention, the number of LED light source 20 used may be decreased, thereby making it possible to promote the reduction of the number of parts and the cost reduction.

In addition, in order to implement the side lighting of the dial plate 50 by the side portions 63 of the prism 60, outer ends of the side portions 63 may be formed of an inclined surface 64 so that light may be concentrated into the center of the dial plate 50.

In addition, the dial plate 50 may be colored with a dark color (black series) in harmony with a color of an interior material to implement a luxuriousness image of a vehicle. In this case, the dial plate 50 may be provided with a light transmitting part 51 by an etching process, or the like to secure visibility of a time display unit.

As described above, according to various embodiments of the present invention, the rear lighting and the side lighting of the dial plate 50 may be implemented and light may be concentrated into the center of the dial plate 50 by the diffusing dots 62 provided on the bottom 61 of the prism 60 and the inclined surface 64 of the side portions 63, thereby making it possible to maximally decrease loss of light scattered and dissipated to the outside of the dial plate 50. As a result, visibility of the clock for the vehicle may be significantly improved.

In addition, since the present invention has the configuration in which the diffusing dots 62 diffusing light is integrally provided in the prism 60, the use of the diffuser may be excluded, thereby making it possible to promote the reduction of the number of parts, the weight reduction and the cost reduction.

In addition, the present invention forms the color of the dial plate 50 configuring a portion of the lighting apparatus of the clock with the dark color (black series) in harmony with the color of the interior material of the vehicle, thereby making it possible to implement the luxuriousness image of the vehicle. Particularly, the light transmitting part 51 is formed in the dial plate 50, thereby making it possible to significantly improve visibility of the time display unit.

According to various embodiments of the present invention, visibility of the clock for the vehicle may be significantly improved by implementing the rear lighting and the side lighting of the dial plate by the bottom of the prism having the diffusing dots formed thereon and the side portion of the prism surrounding the dial plate and concentrating light into the center of the dial plate, the reduction of the number of parts, the weight reduction, and the cost reduction may be promoted by excluding the use of the diffuser diffusing light, and the luxuriousness image of the vehicle may be improved by implementing the color of the dial plate 50 with the dark color in harmony with the color of the interior material of the vehicle.

For convenience in explanation and accurate definition in the appended claims, the terms "inner" or "outer", "front" or "rear", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:
1. A lighting apparatus of a clock for a vehicle, the lighting apparatus comprising:
    a printed circuit board (PCB) for supplying power;
    a light source electrically connected to the PCB and generating light;

a reflector installed to be positioned at a front of the light source and positioned in a case and guiding the light generated from the light source together with the case; and a prism installed to be positioned at a front of the reflector and to surround a dial plate and concentrating the light guided by the reflector and the case into the dial plate, wherein both the reflector and the case are positioned at a rear of the prism between the light source and the prism and the reflector and the case face each other and directly reflect the light therebetween, wherein a bottom of the prism is provided with a plurality of diffusing dots implementing a rear lighting of the dial plate by refracting and scattering light that has been branched into the bottom of the prism, wherein the prism is provided with side portions connected to the bottom of the prism, and wherein the side portions surround an outer frame of the dial plate to prevent the light from being scattered and dissipated to a side of the dial plate.

2. The light apparatus of claim 1, wherein the light source is installed to be positioned between the case and the reflector.

3. The light apparatus of claim 1, wherein the light source is a light emitting diode (LED) light source.

4. The light apparatus of claim 1, wherein the reflector has a size smaller than the case, such that when the reflector is installed in the case, a space is formed between the case and the reflector, and the light source is positioned in the space between the case and the reflector.

5. The light apparatus of claim 1, wherein the case serves as a wave guide reflecting light from the light source together with the reflector to thereby guide the light to the prism.

6. The light apparatus of claim 1, wherein the case has inner surfaces coated to reflect the light.

7. The light apparatus of claim 1, wherein the diffusing dots are formed on the bottom of the prism and protruded from the bottom of the prism toward the PCB.

8. The light apparatus of claim 1, wherein outer ends of the side portions are formed to include an inclined surface or surfaces to concentrate the light into a center of the dial plate, thereby implementing a side lighting of the dial plate by the side portions of the prism.

9. The light apparatus of claim 1, wherein the dial plate is formed to have a dark color in harmony with a color of an interior material, and the dial plate is provided with a light transmitting part to secure visibility of a time display unit.

* * * * *